United States Patent [19]

Kress

[11] Patent Number: 5,904,452
[45] Date of Patent: May 18, 1999

[54] CHIP REMOVING PRECISION FINISHING TOOL

[75] Inventor: Dieter Kress, Aalen, Germany

[73] Assignee: Mapal Fabrik Fur Prazisionswerkzeuge, Aalen, Germany

[21] Appl. No.: 08/796,913

[22] Filed: Feb. 6, 1997

Related U.S. Application Data

[63] Continuation of application No. 08/731,819, Oct. 21, 1996, abandoned.

[30] Foreign Application Priority Data

Oct. 20, 1995 [DE] Germany ............................ 195 39 119

[51] Int. Cl.[6] ..................................................... B23B 27/10
[52] U.S. Cl. .............................. 408/57; 407/5; 408/199; 408/231; 408/713
[58] Field of Search .............................. 408/1 R, 57, 81, 408/82, 83, 199, 231, 233, 713; 407/2, 5, 6, 115

[56] References Cited

U.S. PATENT DOCUMENTS

| | | | |
|---|---|---|---|
| 2,967,442 | 1/1961 | Forsyth et al. ............................ | 408/199 |
| 3,295,187 | 1/1967 | Plummer ....................................... | 407/2 |
| 3,410,160 | 11/1968 | Le Barre ...................................... | 407/2 |
| 4,201,500 | 5/1980 | Kralowetz et al. .......................... | 407/5 |
| 4,353,669 | 10/1982 | Striegl ...................................... | 408/713 |
| 4,850,757 | 7/1989 | Stashko .................................... | 408/199 |
| 5,217,333 | 6/1993 | Hunt ......................................... | 408/199 |
| 5,494,383 | 2/1996 | Kress et al. .............................. | 408/231 |

FOREIGN PATENT DOCUMENTS

| | | | |
|---|---|---|---|
| 1379930 | 10/1964 | France ....................................... | 408/713 |
| 25 02 183 | 7/1976 | Germany . | |
| 36 30 403 A 1 | 9/1986 | Germany . | |

Primary Examiner—Daniel W. Howell
Attorney, Agent, or Firm—Darby & Darby

[57] ABSTRACT

A chip removal tool for finishing the radial surface of a bore and having a cylindrical bit for mounting a cutting element and a deflector positioned adjacent the cutting element to deflect chips cut from the bore and urging the chips into a flow of fluid from respective cooling and lubricating sources.

7 Claims, 3 Drawing Sheets

CHIP REMOVING PRECISION FINISHING TOOL

This application is a continuation of U.S. patent application Ser. No. 08/731,819, filed Oct. 21, 1996, now abandoned.

FIELD OF THE INVENTION

The invention relates to a metal finishing tool, and more particularly a chip removing tool having a chip deflector to reliably remove metallic shavings or chips from the radial surface of a precision formed borehole.

BACKGROUND OF THE INVENTION

High precision machining typically requires a relatively high level of inspection or quality control to assure acceptability of relatively high dimensional tolerances. For those dimensions that fail to meet the required tolerances, substantial rework may be required, or worse yet, the hardware may have to be scrapped. These problems are especially true for reaming tools or reamers.

Conventional reamers create precision bores in metallic components. Typical tools incorporate a cutting bit that incrementally removes base material to form the borehole. Respective coolant and lubricant sources are often disposed at the cutting area to create a fluid flow directed away from the area. The coolant and lubricant serves primarily to extend the life of the cutting bit. However, a secondary function of the fluid involves carrying away the metallic shavings and chips created from the cutting process.

While conventional reamers often adequately perform their intended functions, by relying solely on fluid flow to discharge the metallic shavings or chips, full and complete discharge of the material from the borehole often fails to occur with sufficient reliability. This often results in unacceptable surface corrugations and grooves in the finished surface, requiring costly rework to remove. Moreover, should inspection fail to reveal the presence of a nondischarged chip, satisfactory operation of an overall hardware assembly may be substantially compromised should the chip dislodge and circulate freely though an assembled system.

Therefore, those skilled in the art have recognized the need for a chip removal tool that reliably discharges chips from the radial surface of a borehole and minimizes costly rework, scrap and unexpected contamination of a follow-on assembly. The chip removal tool of the present invention satisfies these needs.

SUMMARY OF THE INVENTION

The chip removal tool of the present invention improves the reliability of the bore finishing process, thereby minimizing costly rework or scrapping of high precision hardware. To realize these advantages, the invention axially inserts into a formed bore to incrementally remove material from the bore. The tool cooperates with respective cooling and lubricating sources that produce a fluid flow and includes a cylindrical bit having an external radial periphery. A cutting element mounts to the bit and is disposed axially along the bit periphery. A cutting edge formed on the element projects radially outwardly from the bit periphery a predetermined distance. This allows the edge to engage the radial surface of the bore. The tool further includes a deflector disposed proximate the cutting edge, when the bit advances through the bore and rotates to place the edge in cutting engagement with the bore radial surface, to direct chips cut by the edge into the fluid flow and away from the bore.

Other features and advantages of the present invention will be apparent from the following detailed description when read in conjunction with the accompanying drawings.

DETAILED DESCRIPTION OF THE INVENTION

Figure 1:
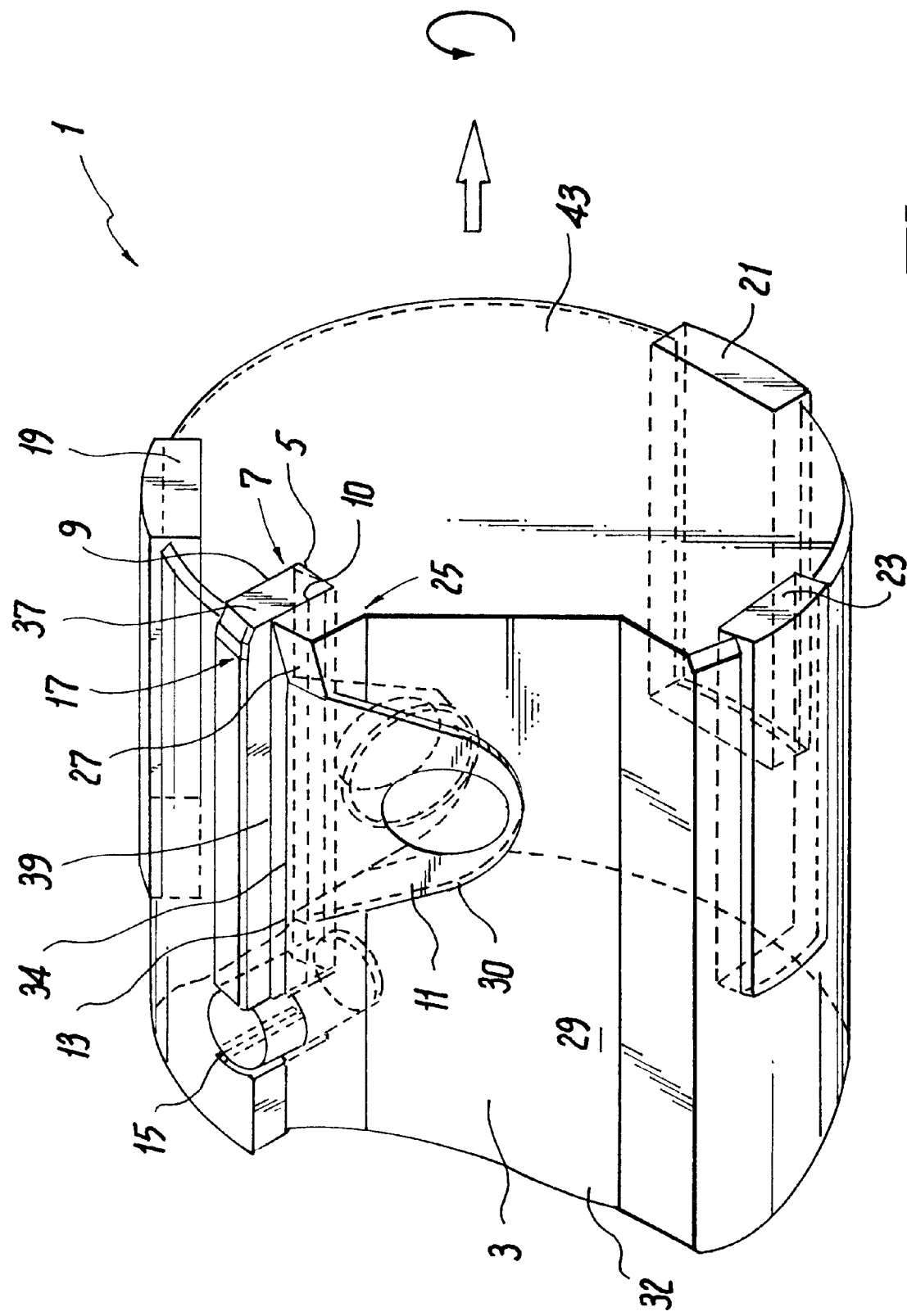
FIG. 1 is a perspective frontal view of a tool according to one embodiment of the present invention.

Referring now to FIG. 1, a chip removal tool 1 according to one embodiment of the present invention includes a cylindrical bit 3 formed with an outwardly opening axial groove 5 for receiving a cutting element or knife plate 7. The groove is formed with confronting walls that extend axially in parallel relation but have differing heights. A trailing edge 9 (as seen in the direction of rotation) of the groove sits higher than an oppositely disposed leading edge 10 (as seen in the direction of rotation). The interior of the bit is formed substantially hollow to define a chip space or cavity 29. Alternatively, the bit may be formed with respective coolant and lubrication ducts 52 and 56 to direct fluid flow 54 from a coolant and lubrication source 50 directly into the chip collection cavity and assist in discharging chips in any direction.

The bit includes an integrally formed chip deflector 25 comprising a formed projection, disposed adjacent the groove 5 to define a portion of the leading edge 10. The chip deflector 25, constructed as a projection, thus protrudes over the upper edge of the leading edge 10 towards the outside (as seen in the radial direction of the bit 3) and projects radially in the direction of rotation with respect to the upper leading edge 10. The deflector is formed with a chip-deflecting surface 27, that slopes inwardly counter to the direction of advance. When assembled to the knife plate, the surface 27 is disposed below an active cutting edge 17 of the knife plate 7 and above a clamping shoe 11, so that chips, removed by the cutting edge 17, strike the chip-deflecting surface 27 and are deflected counter to the advancing direction.

The chip-deflecting surface 27 is preferably hardened, in order to keep the wear here at a low level. It is also conceivable to insert a chip-deflecting element in the bit 3 of the tool 1, which acts as a chip deflector 25 and extends over the chip-guiding step 39 as far as the running-off region of the chips removed by the cutting edge 17. For such an embodiment, the chip deflector or the chip-deflecting element can be replaced in the case of wear.

The cutting element or knife plate 7 is formed into a narrow and substantially rectangular block to nest within the groove 5. The cutting edge 17 is formed along the outermost leading edge extremity of the knife plate. When assembled to the bit 3, the cutting edge of the knife plate projects radially outward from the periphery of the bit a predetermined distance to engage the radial surface of a bore during operation.

The knife plate attaches to the bit by means of a clamping shoe 11. The shoe includes an external flange 30 formed with a threaded throughbore for receiving a clamping screw (not shown). It is evident from the representation of FIG. 1 that, for optimizing the discharge of chips within the chip space 29, the surface 30 of the clamping shoe 11 coincides with the surface 32 of the chip space 29, so that the clamping shoe practically avoids projecting into the chip space 29. The edge of the clamping shoe 11, which serves for fastening the knife plate 7 and rests on the front side of the knife, extends parallel to a clamping chamfer 13 at a distance from the radially outside knife edge or the cutting edge of the knife plate 7, which is smaller than the distance of the chip deflector 25 from the outside knife edge. This means that the chip deflector 25 protrudes over the edge 34 of the clamping shoe 11, so that chips running off from the active cutting edge 17 initially strike the chip deflector 25, before they, if at all, strike the surface 30 of the clamping shoe 11.

In the case of the example shown here, the highest point of the descending chip deflecting surface 27 of the active cutting edge 17 is closest to or extends at least up to a chip-guiding step 39 formed in the front side of the knife. The lowest point of this descending chip deflecting surface 27 is level with the edge 34 of the clamping shoe 11. It is, however, also possible that there is one step to the clamping shoe here. It is important that the chip deflection surface 27 serves as a gathering surface for the chips removed by the active cutting edge 17 and deflects these in the direction of the coolant and lubricant flow 54 discharging the chips from the finishing region.

To precisely position the bit axially within the bore to be finished, the bit includes a plurality of spaced apart spacer strips 19, 21 and 23. The arrangement and function of such spacers are typically known to those skilled in the art and warrant no further description.

In operation, the bore finishing process includes inserting the tool 1 axially into the bore and rotating the tool clockwise, (as seen in the advancing direction indicated by the double arrow of FIG. 1), so that the active cutting edge 17 can cut off the chips from the bore radial surface. It is also possible to bring about relative motion between the tool and the workpiece by virtue of the fact that the workpiece is caused to rotate with respect to the stationary tool. In the case of the example shown here, it is assumed that the tool 1 is introduced into the stationary workpiece in the advancing direction, and, at the same time, rotates in a clockwise direction. Chips, running off from the cutting edge 17, strike the chip deflector 25. The chips deflected by the deflector are urged into the chip space 29 and are discharged from the bore by the flow 54 of coolant and lubricant introduced through the cooling and lubrication fluid ducts 52 and 56. The flow 54 proceeds in the direction in which the chips are deflected from the chip-rejecting surface.

Figure 2:
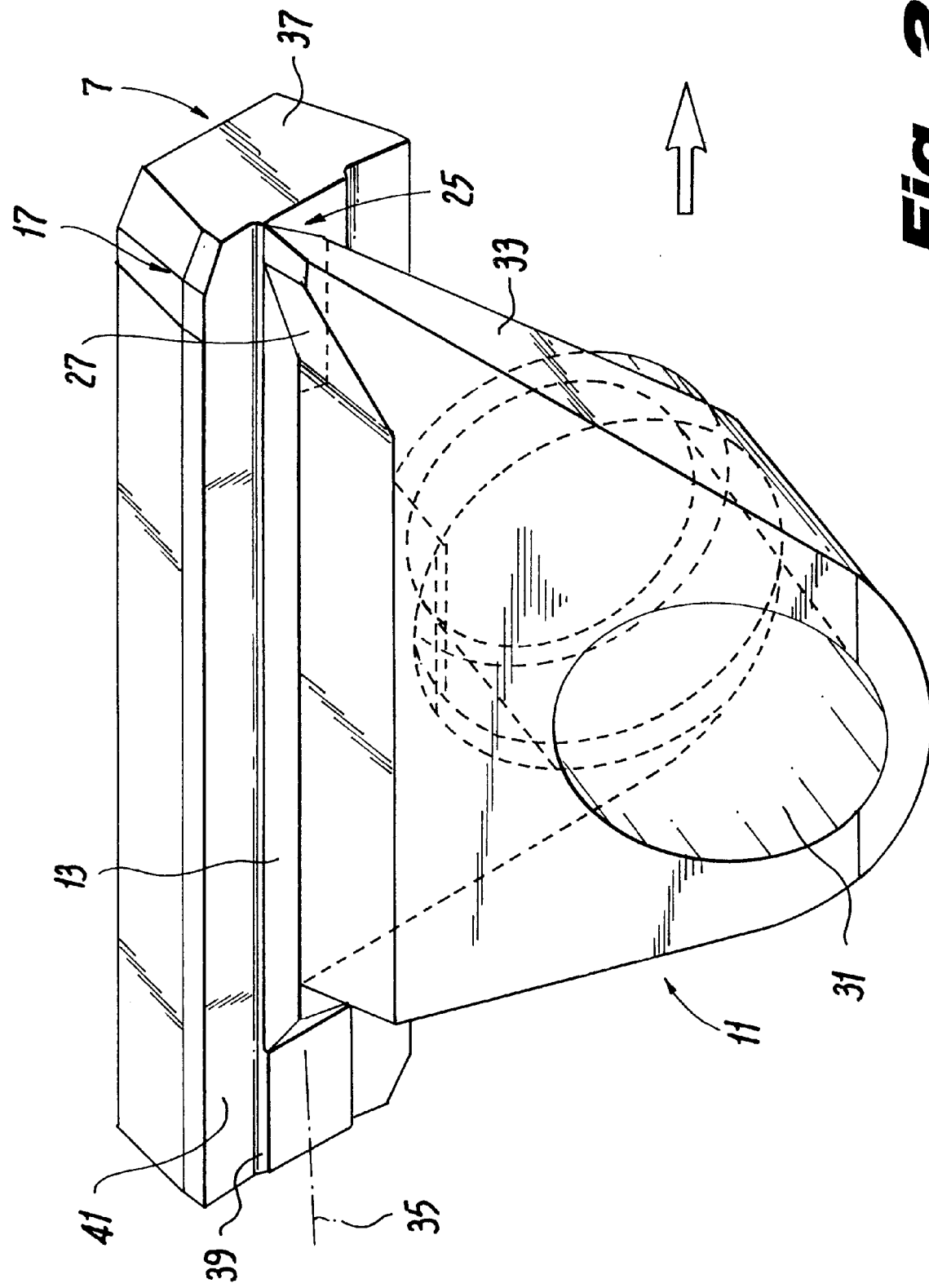
FIG. 2 is a perspective view of a clamping shoe illustrating a deflector similar to that shown in FIG. 1.

FIG. 2 illustrates an alternative embodiment of the clamping shoe 11' formed substantially similar to the shoe 11 illustrated in FIG. 1 but including an integrally formed deflector 25'. The deflector 25' comprises a projection that extends beyond the width of the clamping notch 13' forward in the advancing direction of the bit and over the imaginary center line 35' of the knife plate 7' upwards in the direction of the active cutting edge 17'.

In the case of the examples shown in FIGS. 1 and 2, the chips are deflected counter to the advancing direction. In both cases, it is assumed that a coolant and lubricant flow, counter to the advancing direction, is produced, which passes the chips out of the finishing region and which is particularly preferred for finishing blind holes. It thus becomes clear that, for the embodiments of FIGS. 1 and 2, the discharging effect of this flow is supported by the chip deflector 25.

It is a common feature of the two embodiments of the chip deflector 25, which are shown in FIGS. 1 and 2, that the respective chip deflectors 25 and 25' extend up to the front ends 37 and 37' of the respective knife plates 7 and 7', and reach beyond the respective center lines 35 and 35' of the knife plates 7 and 7' at least up to respective chip-guiding steps 39 and 39'. The steps are formed in the respective front sides of the knifes and form respective boundaries of respective chip surfaces 41 and 41'. The chip surfaces are introduced into the respective front sides of the knifes and on which the chips, removed by the cutting edges 17 and 17', run off.

Figure 3:
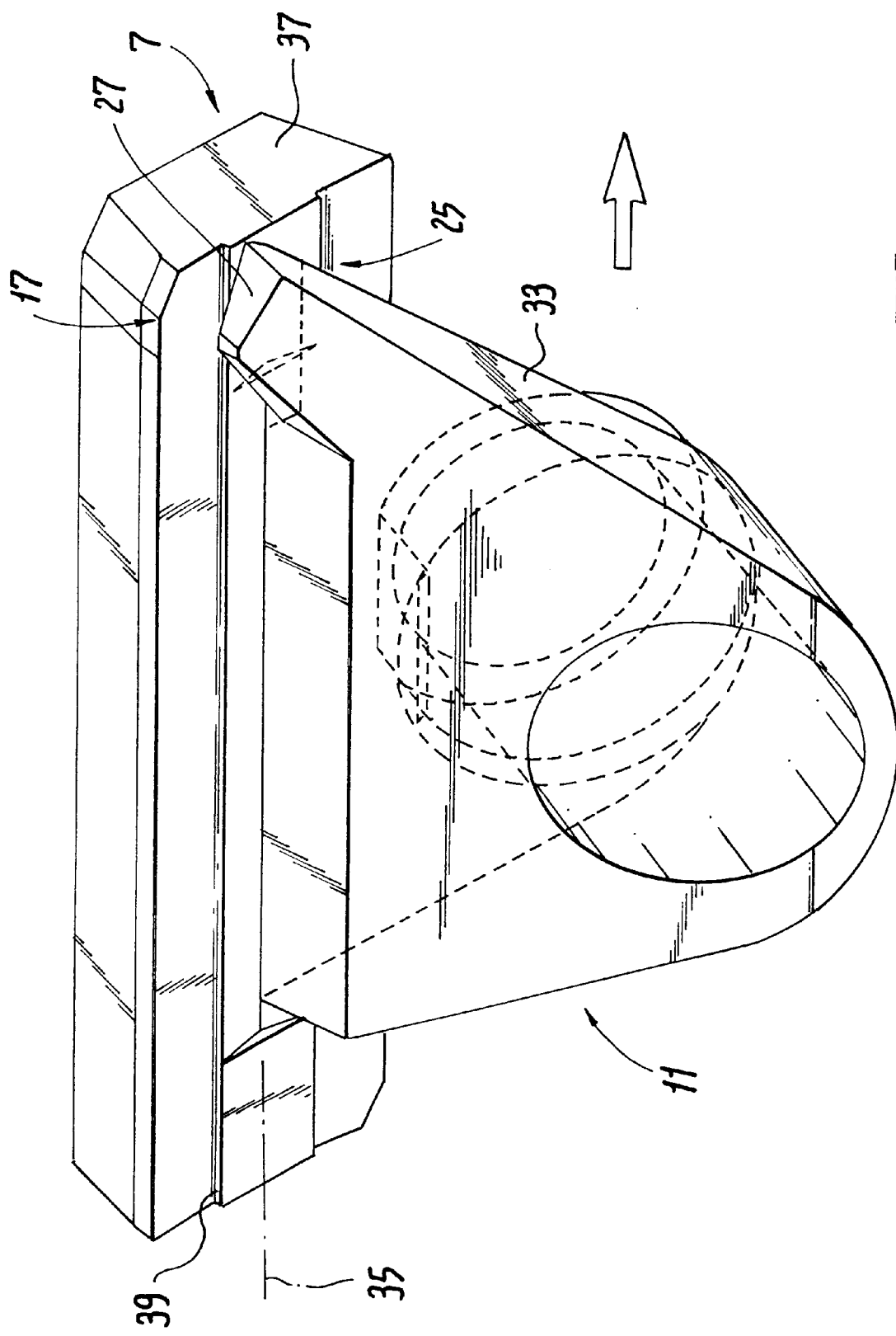
FIG. 3 is a perspective view of a clamping shoe illustrating a deflector similar to that shown in FIG. 2.

FIG. 3 illustrates a third embodiment of a clamping shoe 11" formed similar to the previously described clamping shoes 11 and 11'. The clamping shoe 11" includes an integrally formed chip deflector 25" that projects upwardly and forwardly from the clamping shoe to extend up to the front end 37" of the knife plate 7". Here also, it protrudes beyond the imaginary center line 35" of the knife plate 7" as well as beyond the chip-guiding step 39", but remains below the active cutting edge 17". The chip deflector 25" is formed with a chip-deflecting surface 27" that descends here up to the front end 37" in the advancing direction indicated by the double arrow shown in FIG. 3, so that the chips running off from the cutting edge 17" are deflected in the advancing direction of the bit.

The example shown here is particularly suitable for finishing cases utilizing a coolant and lubricant flow directed in the advancing direction, as is particularly the case for the finishing of throughbores.

The chip deflector 25", shown in FIG. 3, is distinguished by the fact that the chips removed from the bore radial surface by the knife plate 7" or the active cutting edge 17" are deflected in the direction of the coolant and lubricant flow, so that their discharging action is improved. With that, it is ensured that none of the chips remain in the finishing region which could have a negative effect on the surface quality and/or the dimensions of the borehole being finished.

A common feature of the examples shown in FIGS. 2 and 3 anticipates excessive wear of the chip-deflecting surfaces 27' and 27", and provides for replacement of the chip deflectors 25' and 25" by replacing the respective clamping shoes 11' and 11".

The inventor has also discovered that, in some circumstances, it is advantageous to provide a chip deflector on the surface of the knife plate 7, facing the clamping shoe 11, i.e., on the front side of the knife, (also referred to as knife front), which has a chip-deflecting surface, which deflects the chips removed by the knife-cutting edge 17 in the direction of a coolant and lubricant flow. Such a chip deflector on the front side of a knife plate would have to have approximately the shape of the chip deflector 25, which is explained by means of FIGS. 1 to 3, in order to bring about a deflection of the chips.

Those skilled in the art will appreciate the many advantages afforded by the chip removing tool of the present invention. By implementing a deflector positioned adjacent the cutting element, chips cut from the bore radial surface are much more likely to be directed into the stream of fluid formed by the escaping coolant and lubricant. As a result, the quality of the finished component is substantially improved, minimizing potential rework and possible scrap. Additionally, the present invention minimizes the possibility of a loosely held chip disengaging from the bore surface at a later time, contaminating a follow-on assembly and possibly damaging high precision components.

While the invention has been particularly shown and described with reference to the preferred embodiments thereof, it will be understood by those skilled in the art that various changes in form and detail may be made therein without departing from the spirit and scope of the invention.

What is claimed is:

1. A chip removal tool for axial insertion into a formed bore having a radial surface to incrementally remove material from said bore, said tool having a direction of advancement and disposed in communication with respective cooling and lubricating sources producing a fluid flow, said tool including:
    a cylindrical bit having an external radial periphery and an internal collection cavity in communication with said fluid flow;
    a cutting element mounted to said bit and disposed axially along said periphery, said cutting element including a cutting edge projecting radially outwardly from said periphery a predetermined distance to engage the radial surface of said bore; and
    a deflector disposed proximate said cutting edge, to direct chips cut by said edge into said internal collection cavity and away from said bore when said bit advances through said bore and rotates to place said cutting edge in cutting engagement with said bore radial surface,
    wherein said deflector is formed integral with said cylindrical bit and includes a chip deflecting surface declining radially inwardly in a direction generally opposite the direction of advancement of said tool.

2. A chip removal tool according to claim 1 and further including:
    a plurality of spaced apart spacers disposed along said bit periphery to precisely position said bit axially within said bore.

3. A chip removal tool according to claim 1 wherein:
    said bit further includes respective coolant and lubricant ducts disposed adjacent said cutting element for precisely directing said coolant flow.

4. A chip removal tool for axial insertion into a formed bore having a radial surface to incrementally remove material from said bore, said tool disposed in communication with respective cooling and lubricating sources producing a fluid flow, said tool including:
    a cylindrical bit having an external radial periphery and an internal collection cavity in communication with said fluid flow;
    a cutting element mounted to said bit and disposed axially along said periphery, said cutting element including a cutting edge projecting radially outwardly from said periphery a predetermined distance to engage the radial surface of said bore;
    a deflector disposed proximate said cutting edge, to direct chips cut by said edge into said internal collection cavity and away from said bore when said bit advances through said bore and rotates to place said cutting edge in cutting engagement with said bore radial surface; and
    a clamp attached to said cutting element and said cylindrical bit to immobilize said cutting element in said slot,
    wherein said cutting element comprises a narrow rectangular shaped block having respective leading and trailing edges, said cutting edge formed along said leading edge, wherein said internal collection cavity is formed with an outwardly opening axial slot along said periphery to receive said cutting element, and wherein said deflector is formed integral with said cutting element.

5. A chip removal tool for axial insertion into a formed bore having a radial surface to incrementally remove material from said bore, said tool disposed in communication with respective cooling and lubricating sources producing a fluid flow, said tool including:
    a cylindrical bit having an external radial periphery and an internal collection cavity in communication with said fluid flow;
    a cutting element mounted to said bit and disposed axially along said periphery, said cutting element including a cutting edge projecting radially outwardly from said periphery a predetermined distance to engage the radial surface of said bore;
    a deflector disposed proximate said cutting edge, to direct chips cut by said edge into said internal collection cavity and away from said bore when said bit advances through said bore and rotates to place said cutting edge in cutting engagement with said bore radial surface; and
    a clamp attached to said cutting element and said cylindrical bit to immobilize said cutting element in said slot,
    wherein said cutting element comprises a narrow rectangular shaped block having respective leading and trailing edges, said cutting edge formed along said leading edge, wherein said internal collection cavity is formed with an outwardly opening axial slot along said periphery to receive said cutting element, and wherein said deflector is formed integral with said clamp.

6. A chip removal tool for axial insertion into a formed bore to incrementally remove material from said borehole, said tool having a direction of advancement and cooperating with respective cooling and lubricating sources producing a fluid flow, said tool including:
    a cylindrical bit having an external radial periphery formed with an outwardly opening axial slot and an internal collection cavity in communication with said fluid flow;
    a cutting element mounted to said bit and disposed axially along said periphery within said slot, said element comprising a narrow rectangular shaped block having respective leading and trailing edges, said leading edge formed into a cutting edge projecting radially outwardly from said periphery a predetermined distance to engage the radial surface of said bore;
    a clamp attached to said cutting element and said cylindrical bit to immobilize said element in said slot; and
    a deflector disposed proximate said cutting edge to direct chips cut by said edge into said internal collection cavity and away from said bore when said bit advances through said bore and rotates to place said cutting edge in cutting engagement with said bore radial surface,
    wherein said deflector is formed integral with said cylindrical bit and includes a chip deflecting surface declining radially inwardly in a direction generally opposite the direction of advancement of said tool.

7. A chip removal tool for axial insertion into a formed bore having a radial surface to incrementally remove material from said bore, said tool disposed in communication with respective cooling and lubricating sources producing a fluid flow, said tool including:
    a cylindrical bit having an external radial periphery and an internal collection cavity in communication with said fluid flow; and
    a cutting element mounted to said bit and disposed axially along said periphery, said cutting element including a cutting edge projecting radially outwardly from said periphery a predetermined distance to engage the radial surface of said bore;

a deflector disposed proximate said cutting edge, to direct chips cut by said edge into said internal collection cavity and away from said bore when said bit advances through said bore and rotates to place said cutting edge in cutting engagement with said bore radial surface; and wherein said cutting element includes a chip guiding step and said deflector projects over said chip guiding step.

* * * * *

UNITED STATES PATENT AND TRADEMARK OFFICE
CERTIFICATE OF CORRECTION

PATENT NO. : 5,904,452
DATED : May 18, 1999
INVENTOR(S) : Dieter KRESS

It is certified that error appears in the above-identified patent and that said Letters Patent is hereby corrected as shown below:

Title page, [73] Assignee, change "Mapal Fabrik Fur Präzisionswerkzeuge" to read --MAPAL Fabrik für Präzisionswerkzeuge--.

Signed and Sealed this

First Day of August, 2000

Attest:

Q. TODD DICKINSON

Attesting Officer

Director of Patents and Trademarks